US011042330B2

(12) United States Patent
Marripudi et al.

(10) Patent No.: US 11,042,330 B2
(45) Date of Patent: Jun. 22, 2021

(54) METHODS AND SYSTEMS FOR DISTRIBUTED DATA STORAGE

(71) Applicant: Samsung Electronics Co., Ltd., Suwon-si (KR)

(72) Inventors: Gunneswara Marripudi, Fremont, CA (US); Kumar Kanteti, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 15/589,833

(22) Filed: May 8, 2017

(65) Prior Publication Data

US 2018/0253260 A1 Sep. 6, 2018

Related U.S. Application Data

(60) Provisional application No. 62/465,684, filed on Mar. 1, 2017.

(51) Int. Cl.
*G06F 3/06* (2006.01)

(52) U.S. Cl.
CPC ............ *G06F 3/0688* (2013.01); *G06F 3/064* (2013.01); *G06F 3/067* (2013.01); *G06F 3/0611* (2013.01)

(58) Field of Classification Search
CPC ..... G06F 3/0659; G06F 3/0611; G06F 3/0688
See application file for complete search history.

(56) References Cited

U.S. PATENT DOCUMENTS

| | | | |
|---|---|---|---|
| 7,103,686 B1* | 9/2006 | Lin | G06F 3/0607 370/392 |
| 7,734,598 B2 | 6/2010 | Noguchi et al. | |
| 7,904,429 B2 | 3/2011 | Villaret et al. | |
| 8,650,372 B2* | 2/2014 | Gold | G06F 11/1461 707/640 |
| 8,874,842 B1* | 10/2014 | Kimmel | G06F 3/0611 711/114 |
| 9,201,803 B1* | 12/2015 | Derbeko | G06F 12/12 |
| 9,274,710 B1* | 3/2016 | Oikarinen | G06F 3/061 |
| 9,405,483 B1* | 8/2016 | Wei | G06F 3/065 |
| 9,417,803 B2 | 8/2016 | Sandel et al. | |
| 9,495,478 B2 | 11/2016 | Hendrickson et al. | |
| 2004/0049682 A1* | 3/2004 | Wilson | G06F 12/1408 713/181 |
| 2005/0033749 A1* | 2/2005 | M'Zoughi | G06F 16/10 |

(Continued)

FOREIGN PATENT DOCUMENTS

| | | |
|---|---|---|
| CN | 102880570 B | 4/2016 |
| CN | 106250064 A | 12/2016 |
| KR | 10-1579941 B1 | 12/2015 |

*Primary Examiner* — Yaima Rigol
(74) *Attorney, Agent, or Firm* — Lewis Roca Rothgerber Christie LLP

(57) ABSTRACT

Provided is a method of storing data in a distributed environment including a plurality of storage devices, the method including: receiving a request to store the data; calculating a hash value by applying a hashing function to a value associated with the data; splitting the hash value into a plurality of weights, each weight corresponding to one of a plurality of chunks; selecting a chunk of the plurality of chunks based on the weight; and storing the data in a corresponding storage device, the corresponding storage device corresponding to the selected chunk.

14 Claims, 8 Drawing Sheets

(56) References Cited

U.S. PATENT DOCUMENTS

| | | | |
|---|---|---|---|
| 2005/0257012 A1* | 11/2005 | Hughes | G06F 13/1605 |
| | | | 711/151 |
| 2008/0091916 A1* | 4/2008 | Hashemi | G06F 3/0665 |
| | | | 711/209 |
| 2008/0195581 A1* | 8/2008 | Ashmore | G06F 3/0607 |
| 2010/0057750 A1* | 3/2010 | Aasted | G06F 16/10 |
| | | | 707/E17.032 |
| 2010/0174865 A1 | 7/2010 | Koester | |
| 2013/0326154 A1* | 12/2013 | Haswell | G06F 12/0864 |
| | | | 711/141 |
| 2014/0229696 A1* | 8/2014 | Feng | G06F 3/064 |
| | | | 711/162 |
| 2015/0067245 A1* | 3/2015 | Kruger | G06F 3/0634 |
| | | | 711/103 |
| 2015/0301743 A1 | 10/2015 | Nagao et al. | |
| 2015/0378822 A1* | 12/2015 | Grube | G06F 11/1092 |
| | | | 714/763 |
| 2016/0011979 A1* | 1/2016 | Islam | G06F 3/0631 |
| | | | 711/102 |
| 2016/0041918 A1* | 2/2016 | Jeong | G11C 15/046 |
| | | | 711/103 |
| 2016/0048332 A1 | 2/2016 | Kimmel et al. | |
| 2016/0124668 A1* | 5/2016 | Inbar | G06F 3/0619 |
| | | | 711/162 |
| 2016/0179618 A1* | 6/2016 | Resch | G06F 16/27 |
| | | | 714/764 |
| 2016/0232055 A1* | 8/2016 | Vairavanathan | G06F 11/1076 |
| 2017/0262223 A1* | 9/2017 | Dalmatov | G06F 3/0605 |

* cited by examiner

METHODS AND SYSTEMS FOR DISTRIBUTED DATA STORAGE

CROSS-REFERENCE TO RELATED APPLICATION(S)

The present application claims priority to and the benefit of U.S. Provisional Application No. 62/465,684, filed Mar. 1, 2017, entitled "HYBRID DATA LOOKUP METHODS", the entire content of which is incorporated herein by reference.

FIELD

One or more aspects of embodiments according to the present invention relate to distributed data storage systems and, more particularly, to managing data in a distributed environment (e.g., by using key value solid state drives (KV SSDs)).

BACKGROUND

Related distributed data storage systems use the output of a hash function in different ways to handle data placement and caching.

Related art file systems use inode based metadata to manage space. This involves translating the mapping (file system identity (ID), offset in file) to device logical block addresses. The metadata management during read/writes directly involves performing Input/Outputs (IOs) to the underlying device, resulting in higher user IO latency.

SUMMARY

Aspects of embodiments according to the present invention relate to a method of managing data in a distributed environment using a weight based approach.

According to an embodiment of the present invention, there is provided a method of storing data in a distributed environment including a plurality of storage devices, the method including: receiving a request to store the data; calculating a hash value by applying a hashing function to a value associated with the data; splitting the hash value into a plurality of weights, each weight corresponding to one of a plurality of chunks; selecting a chunk of the plurality of chunks based on the weight; and storing the data in a corresponding storage device, the corresponding storage device corresponding to the selected chunk.

The distributed environment may further include a plurality of storage device openings, each of the storage device openings indicating a reserved spot for adding a future storage device. Each of the plurality of chunks may correspond to either one of the plurality of storage devices or one of the plurality of storage device openings. The selecting the chunk may include: determining a highest weight chunk of the plurality of chunks; determining whether the highest weight chunk corresponds to one of the storage devices or one of the storage device openings; when the highest weight chunk corresponds to one of the storage devices, selecting the highest weight chunk; and when the highest weight chunk corresponds to one of the storage device openings: determining a chunk with a highest weight among the plurality of chunks corresponding to the storage devices; and selecting the chunk with the highest weight among the plurality of chunks corresponding to the storage devices.

Each of the storage devices and storage device openings may be assigned a device identity (ID) that indicates an order in which the storage devices were added to the distributed environment or an order in which future storage devices will fill the storage device openings in the distributed environment. Each of the chunks may include a chunk ID equal to the device ID of the chunk's corresponding one of the plurality of storage devices or the chunk's corresponding one of the plurality of storage device openings. When the highest weight chunk corresponds to one of the storage devices, the data my be stored in a hop container, with a corresponding hop count value equal to zero, in the corresponding storage device. When the highest weight chunk corresponds to one of the storage device openings, the data may be stored in a hop container, the hop container having a corresponding hop count value equal to the chunk ID of the highest weighted chunk minus a highest device ID assigned to any of the storage devices, in the corresponding storage device.

A hop count value corresponding to a particular hop container may indicate how many more storage devices are to be added to the distributed environment before the data in the particular hop container is moved to a new storage device.

The method may further include: determining a second highest weight chunk of the plurality of chunks corresponding to the storage devices; and storing a replica of the data in a second corresponding storage device, the second corresponding storage device corresponding to the second highest weight chunk. In the distributed environment, when a data read request is received, a portion of the data stored in the corresponding storage device and a different portion of the replica of the data stored in the second corresponding storage device may be read concurrently.

The plurality of storage devices may be key value solid state drives (KV SSDs). The hop containers may be KV SSD containers. Within each of the KV SSDs, data associated with a same chunk ID may be stored in a same KV SSD container.

Splitting the hash value into a plurality of weights may include: splitting the hash value into X equal length values that are each Y bits long, where X is equal to a total number of chunks, Y is equal to the length, in bits, of the hash value divided by X, and X and Y are integers. The total number of chunks may be equal to the sum of a total number of the storage devices and a total number of storage device openings.

The plurality of storage devices may be key value solid state drives (KV SSDs).

The value associated with the data may be one of a logical block address (LBA) of the data and a logical unit number (LUN) of the data.

According to an embodiment of the present invention, there is provided a method of adding a new storage device to a distributed environment including a plurality of storage devices, each of the storage devices comprising one or more hop containers, each hop container having a corresponding hop count value, the method including: transferring, to the new storage device, all data located in the hop containers, having the corresponding hop count value equal to one, of each of the plurality of storage devices.

The method may further include: removing the hop containers, having the corresponding hop count value equal to one, of each of the plurality of storage devices; and decreasing all of the corresponding hop count values, that are greater than zero, by one.

The method may further include: hashing, utilizing a hash function, values corresponding to the transferred data; and storing the transferred data in one or more hop containers of the new storage device based on the hashing.

The distributed environment may include a plurality of storage device openings. The storing the transferred data may include: calculating a hash value by applying a hashing function to the data; splitting the hash value into a plurality of weights, each weight corresponding to one of a plurality of chunks, each chunk corresponding to either one of the plurality of storage devices or one of the plurality of storage device openings; determining a highest weight chunk; determining whether the highest weight chunk corresponds to the new storage device or to one of the storage device openings; when the highest weight chunk corresponds to the new storage device, storing the transferred data in a hop container, of the one or more hop containers, having a hop count value of zero; and when the highest weight chunk corresponds to one of the storage device openings, storing the data in a hop container, of the one or more hop containers, with a corresponding hop count value equal to a chunk ID of the highest weighted chunk minus a device ID of the new storage device.

A hop count value corresponding to a particular hop container may indicate how many more storage devices are to be added to the distributed environment before the data in the particular hop container is moved to a new storage device.

The new storage device may be capable of accepting read requests and write requests while the method is being performed.

According to an embodiment of the present invention, there is provided a distributed data storage system including a plurality of storage devices, wherein when data is to be stored to the distributed data storage system a hash value is calculated by applying a hashing function to a value associated with the data, the hash value is split into a plurality of weights, each weight corresponding to one of a plurality of chunks, a chunk of the plurality of chunks is selected, and the data is stored in a corresponding storage device, the corresponding storage device corresponding to the selected chunk.

The distributed data storage system may further include a plurality of storage device openings indicating reserved spots for adding future storage devices. Each of the plurality of storage devices may include a plurality of hop containers and each of the hop containers may have a corresponding hop count value indicating a number of the future storage devices that need to be added before the data is moved. Each chunk may correspond to either one of the plurality of storage devices or one of the plurality of storage device openings.

When selecting the chunk, a highest weight chunk of the plurality of chunks may be determined and it may be determined whether the highest weight chunk corresponds to one of the storage devices or one of the storage device openings. When the highest weight chunk corresponds to one of the storage devices, the highest weight chunk may be selected as the selected chunk, and when the highest weight chunk corresponds to one of the storage device openings a chunk with a highest weight among the plurality of chunks corresponding to the storage devices may be determined and the chunk with the highest weight among the plurality of chunks corresponding to the storage devices may be selected as the selected chunk. When a new storage device is added to the plurality of storage devices, all data located in the hop containers, having the corresponding hop count value equal to one, of each of the plurality of storage devices may be transferred to the new storage device.

The plurality of storage devices may be key value solid state drives (KV SSDs). The hop containers may be KV SSD containers. Within each of the KV SSDs, data associated with a same chunk ID may be stored in a same KV SSD container.

The plurality of storage devices may include a plurality of key value solid state drives (KV SSDs).

BRIEF DESCRIPTION OF THE DRAWINGS

These and other features and aspects of the present invention will be appreciated and understood with reference to the specification, claims, and appended drawings wherein:

DETAILED DESCRIPTION

Figure 1:
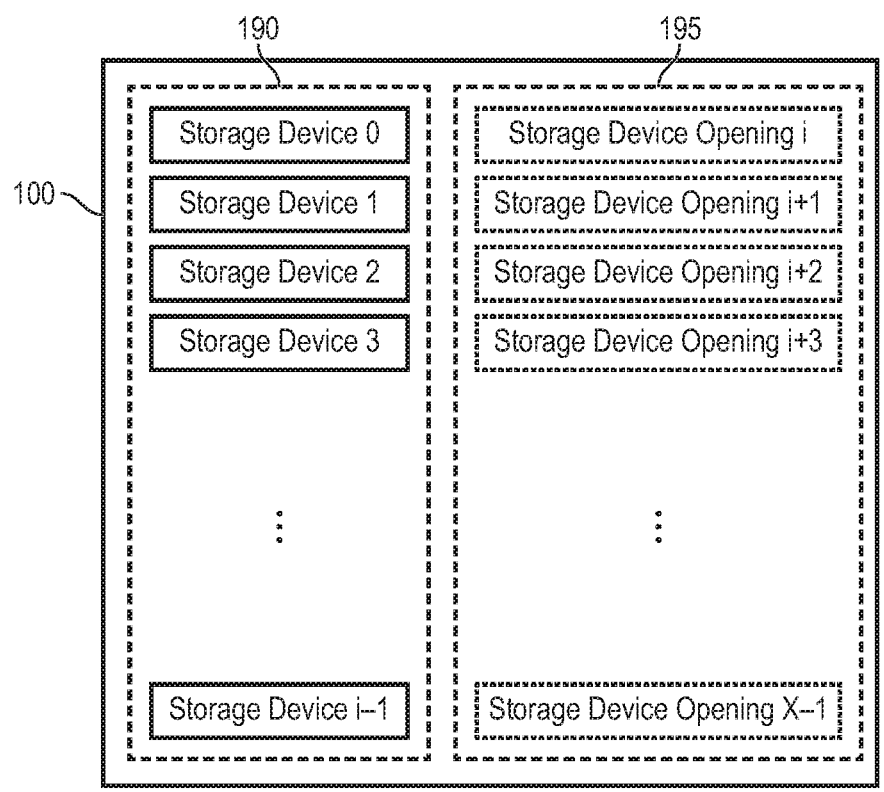
FIG. 1 is a block diagram of a distributed data storage system according to an embodiment of the present invention.

Aspects of embodiments according to the present invention relate to a method of managing data in a distributed environment using a weight based approach.

The detailed description set forth below in connection with the appended drawings is intended as a description of example embodiments of the present invention provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Embodiments of the present invention provide a new mechanism to manage data on a group of disks. An approach using hashing and weights may be used to distribute data across all the drives (or storage devices) in the system. New drives may become part of a pool immediately after metadata structures are updated. The disks may be given hints to manage data and to aid in data movement when new disks are added or removed from the system.

Scale out architectures, like Ceph CRUSH, use a Consistency Distributed Hash Table (CDHT) to manage storage across multiple nodes. Embodiments of the present invention provide an approach to manage storage as an alternative to RAID.

Further, rendezvous hashing may solve the distributed hashing problem by using hash functions unique to the client. Input/output (IO) may be redirected to the client that has the maximum (e.g., the highest) weight.

Embodiments of the present invention provide a method of using computational hashing techniques in conjunction with high-speed low-latency interfaces in solid state drive (SSD) devices to distribute data and support thin provisioning, and leverage key-value SSDs for metadata management of mapping application input/output (IO) requests to physical location (or logical block address (LBA)) on SSDs. Embodiments of the present invention provide a hash and weight based mechanism to manage data across disks.

According to embodiments of the present invention, the method may give hints to disks to efficiently store data. The hints may be used to move data across drives when new disks are added to the system. The metadata footprints required to maintain the structures are small and may easily fit in memory.

Embodiments of the present invention provide a mechanism to do thin provisioning. Data is managed on a group of drives. While the back-end storage can be a block storage, the method can also leverage key value (KV) SSDs for storage. Data is distributed across a group of SSDs. The method may use a crypto hash function to distribute data on disks. Parameters from the incoming IO request (e.g., namespace/logical unit number (lun) identity (ID) and logical file offset in read/write requests) are used as input to the hash function. The lookup according to embodiments of the present invention may reduce or minimize the metadata footprint to be maintained on disk and hence leads to better performance.

According to embodiments of the present invention, during system setup, a plurality of SSDs are grouped together to create a pool. Namespaces/luns are created as virtual elements inside the pool. Parameters from incoming IO are hashed to find the disk owning the data. Data is then fetched to/from the drive to serve the IO.

According to embodiments of the present invention, drive features like LUN/Namespace size extension, drive addition, etc., are treated as pool metadata operations and do not require drive physical namespace modifications. In other words, the namespace is no longer tied to a drive physical namespace. An incoming IO may be hashed and data may be distributed across some or all of the drives. IOs from a single namespace may be stripped across some or all of the drives. Hence the performance/input/output operations per second (IOPs) from a single namespace may be the sum of IOPs from all the drives in the pool. A new drive being added to the pool can immediately take host IOs and hence contribute to the IOPs in the system.

According to embodiments of the present invention, for data management, the pool is divided into a number of segments. A segment is visualized as the maximum number of partitions of the pool. A drive at any point is the owner of one or more segments of the pool and holds all the data associated with that segment.

Figure 2:
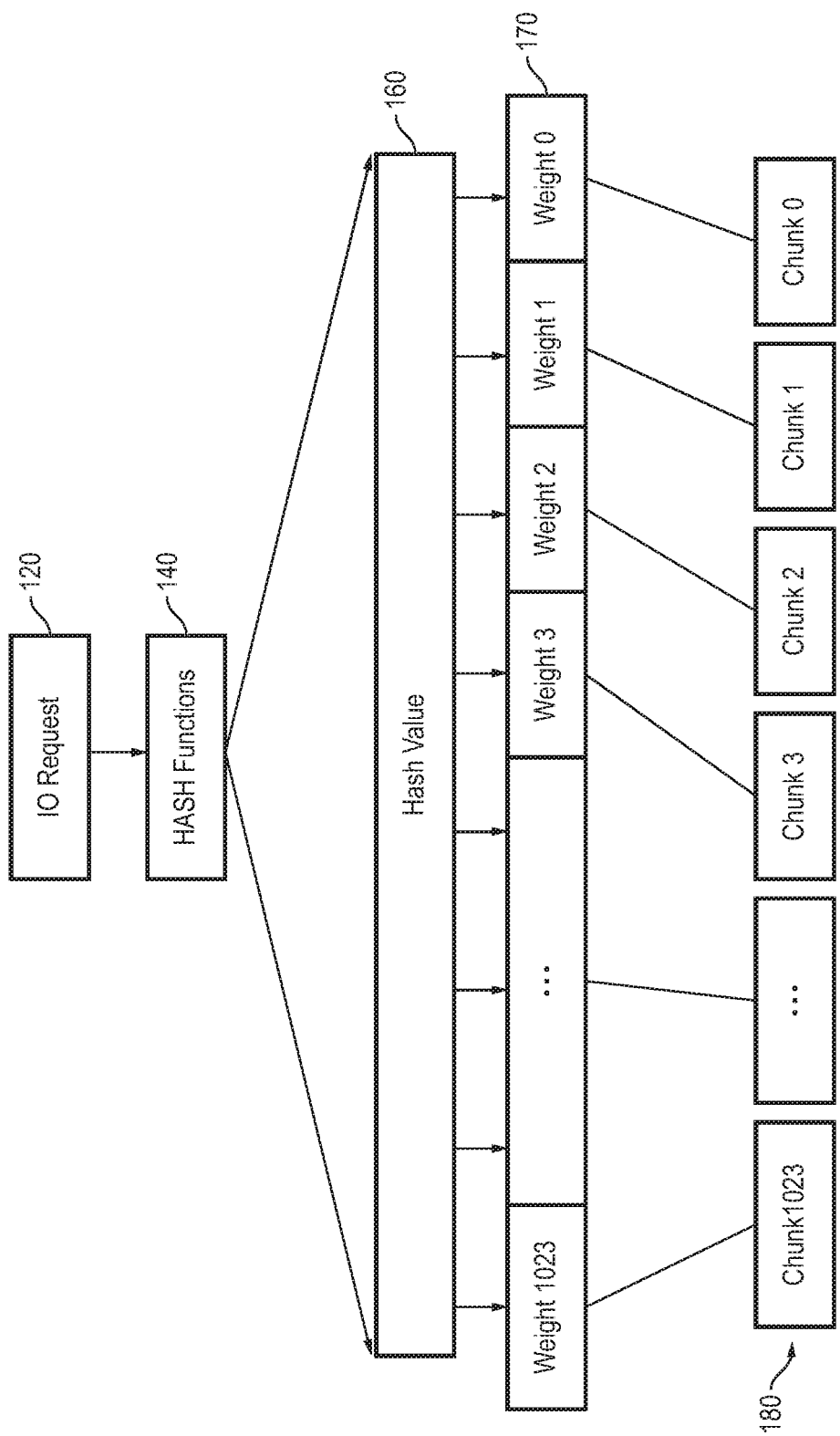
FIG. 2 is a block diagram of a logical view of a method according to an embodiment of the present invention.

FIG. 1 is a block diagram of a distributed data storage system according to an embodiment of the present invention. The distributed data storage system 100 may include a plurality of storage devices 190 (e.g., i storage devices 190, where i is an integer) and a plurality of storage device openings 195 (e.g., X−i storage device openings, where X is an integer). Each of the storage device openings 195 indicates a reserved spot for adding a future storage device 190. The plurality of storage devices 190 may be KV SSDs, but the present invention is not limited thereto and any suitable storage device may be used. The sum of a total number of storage devices 190 and a total number of storage device openings 195 may be X. In the embodiment of FIG. 2, X is shown as 1,024, but the present invention is not limited thereto.

FIG. 2 is a block diagram of a logical view of a method according to an embodiment of the present invention. Referring to FIG. 2, an IO request 120 is received by a distributed data storage system 100 (or distributed environment 100).

The distributed data storage system 100 applies a hash function 140 (or a hashing function 140) or multiple hash functions 140 (or multiple hashing functions 140) to a value associated with the data to calculate a hash value 160. The value associated with the data that may be hashed may be any of the following: a logical block address; a namespace/lun id; a logical file offset in read/write requests; a combination thereof; and/or the like. The hash function 140 is used to uniformly distribute data among the storage devices 190. In one embodiment, a crypto hash function is used to distribute data randomly across all the drives.

The hash value 160 can be broken up into X equal length values, called weights 170 (e.g., Weight 0 to Weight 1023 for X=1,024). Each weight 170 is Y bits long, where Y is an integer. Y is equal to the length of the hash value 160, in bits, divided by X.

Each of the X weights 170 is associated with a chunk 180 (or a segment 180). Each chunk 180 corresponds to at least one of either the plurality of storage devices 190 or the plurality of storage device openings 195. Each portion of the divided hash value 160 (i.e., each of the X weights 170) has its own numerical value. Thus, each time data is hashed, each chunk 180 gets a numerical value associated with it. This numerical value may be called the chunk's "weight" for that particular hash operation and IO. According to some embodiments of the present invention, there are the same number of weights 170 as there are chunks 180 (e.g., there may be 1,024 weights 170 when there are 1,024 chunks 180).

The distributed data storage system 100 further includes a segment table that is a mapping table between the segment identity (ID) and the disk owner. The segment table is consulted to route the IO. The mapping table is typically implemented as a hash. The number of elements and hence the hash size is small and fits into memory. Each hash bucket typically has one element, to make sure data is uniformly distributed across all the drives.

According to an embodiment of the present invention, in order to determine where data is stored (or where data should be stored), a highest weight chunk 180 of the plurality of chunks 180 is selected. According to other embodiments, a lowest weight chunk 180 may be selected or some other weight-based criteria may be used for selecting a chunk 180. The data is stored on the storage device 190 corresponding to (or mapped to) the selected chunk 180. According to some embodiments, the total number of chunks 180 may be equal to the sum of a total number of storage devices 190 and a total number of storage device openings 195.

Figure 3:
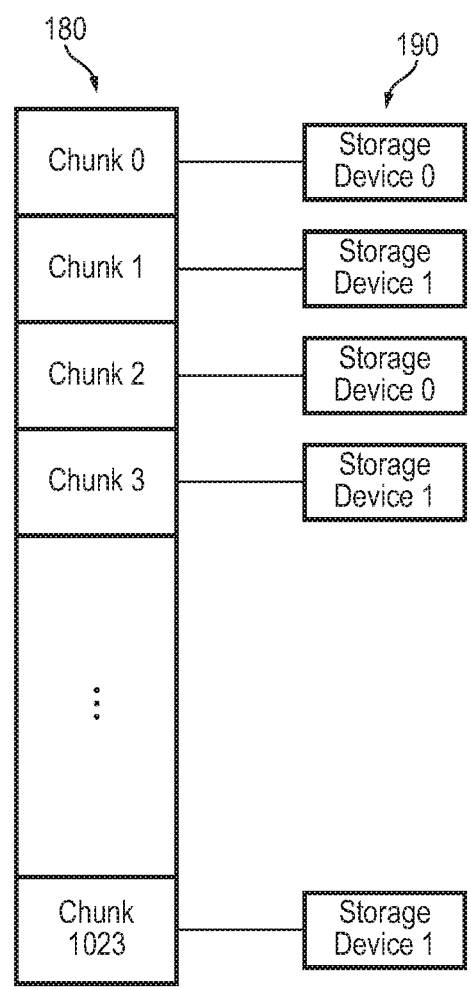
FIG. 3 is a block diagram of a logical view of a segment table in a distributed data storage system according to an embodiment of the present invention.

FIG. 3 is a block diagram of a logical view of a segment table in a distributed data storage system according to an embodiment of the present invention. Referring to FIG. 3, each of the chunks 180 is associated with one of the storage devices 190. In the embodiment of FIG. 3, there are two storage devices 190 (i.e., storage device 1 and storage device 2) and 1,024 chunks 180 as an example, but the present invention is not limited thereto. When there are two storage devices 190 and 1,024 chunks 180, there will be 1,022 storage device openings 195 in the distributed data storage system 100 (1,024−2=1,022).

FIG. 3 shows one example of mapping the chunks 180 to the storage devices 190. According to the embodiment of FIG. 3, the chunks 180 are evenly distributed among the plurality of storage devices 190. For example, when the distributed data storage system 100 includes two storage devices 190, the chunks may be distributed such that even chunks 180 are stored on a first storage device 190 (e.g., storage device 0) and odd chunks 180 are stored on a second storage device 190 (e.g., storage device 1).

While FIG. 3 shows each chunk 180 is assigned to one (and only one) of the storage devices 190, the present invention is not limited thereto, and a single chunk 180 may be split amongst the storage devices 190.

The segment table is an association between the chunk and the device. There may be a one-to-one mapping between the segment table entry and the device. FIG. 3 illustrates a segment table with two Storage Devices in the distributed system. In the embodiment of FIG. 3, chunk 0 can be said to be owned by storage device 0 and chunk 1 can be said to be owned by storage device 1.

The segment table of FIG. 3 has 1024 entries, so the system could potentially have 1024 storage devices 190 in the system, but the present invention is not limited thereto.

Figure 4:
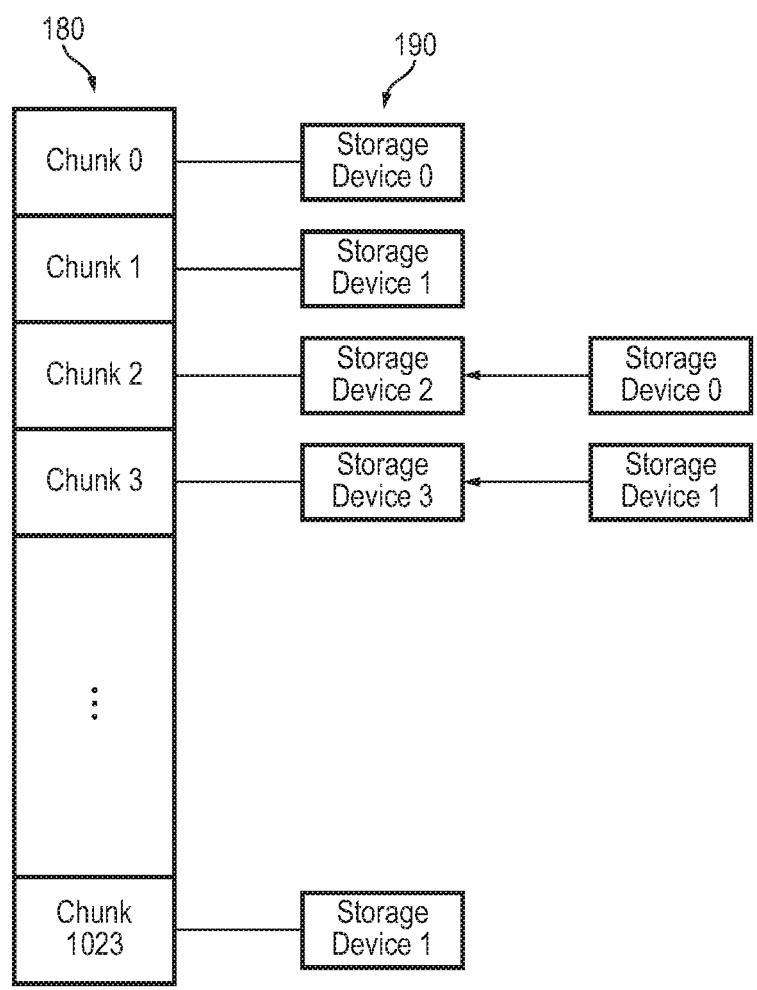
FIG. 4 is a block diagram of a logical view of the segment table when adding storage devices to the distributed data storage system of FIG. 3 according to an embodiment of the present invention.

FIG. 4 is a block diagram of a logical view of the segment table when adding storage devices to the distributed data storage system of FIG. 3 according to an embodiment of the present invention. Referring to FIG. 4, when new storage devices 190 (e.g., storage device 2 and storage device 3) are added to the distributed data storage system 100, data is moved from existing storage devices to the new storage devices.

As can be seen in FIG. 4, when storage device 2 and storage device 3 are added to the distributed data storage system 100, they are assigned to chunk 2 and chunk 3, respectively. In addition, the chunk 2 data (previously stored on storage device 0) is moved to storage device 2 and the chunk 3 data (previously stored on storage device 1) is moved to storage device 3. When a new storage device is added to the system, it takes can be said that the storage device takes ownership of the next chunk.

Data may be stored in containers within the storage devices 190, such that all of the data that is moved when a storage device is added is within a same container. Further, all of the data within that container may be moved. When the storage devices 190 are KV SSDs, the containers may be KV SSD containers.

For example, when chunk 2 data is first stored in the storage device 0, the chunk 2 data is stored in a container that is associated with chunk 2 (e.g., the container is given a label or a name to designate that it is associated with chunk 2). In this way, when storage device 2 is added, the data on storage device 0 does not need to be reevaluated, because all of the data in the chunk 2 container belongs to storage device 2 and is moved to storage device 2.

Further, when the new storage devices 190 are added, other chunks 180 may be assigned to the new storage devices 190 as well. For example, when the distributed data storage system 100 includes only 2 storage devices 190, and there are 1,024 chunks 180, each storage device 190 may store the data associated with 512 chunks 180. Further, when two new storage devices 190 are added, data associated with a plurality of chunks 180 may be moved to each of the new storage devices 190, such that each of the four storage devices 190 stores the data associated with 256 chunks 180.

In this way, data may still be evenly distributed, while not having to rehash the data because the data is already associated with a respective chunk 180, and when the chunk is reassigned to a new drive, all the data associated with the chunk is moved.

According to an embodiment of the present invention, when new storage devices are added to the system, the system dynamically load balances data across all the storage devices. The segment table is used to distribute data among the storage devices. When a new drive takes ownership of the hash bucket in the segment table, an element with the new disk information is added to the head of the list. The updated segment table is distributed to the disks in the system. See also FIG. 8 and the description thereof. An incoming IO may step through the bucket list in the segment table in order until it finds the location for the data. Once the segment table is updated, new IOs may be immediately written to the new storage devices and hence the new storage devices contribute to the IOPs in the system.

A load-balancing thread may be running in the background to move data. Once data is completely moved, the new disk takes ownership of the bucket in the segment table.

For example, let us consider a system configured with 1,024 segments, which is distributed across two storage devices. Consider two storage devices (e.g., drives or disks) being added to the system. The load-factor of the system is 512 (1,024 segment/2 storage devices). When two more storage devices are added the load-factor becomes 256 (1,024/4 storage devices). New storage devices, storage device 2 and storage device 3, take ownership of 256 segments each of the plurality of segments.

Figure 5:
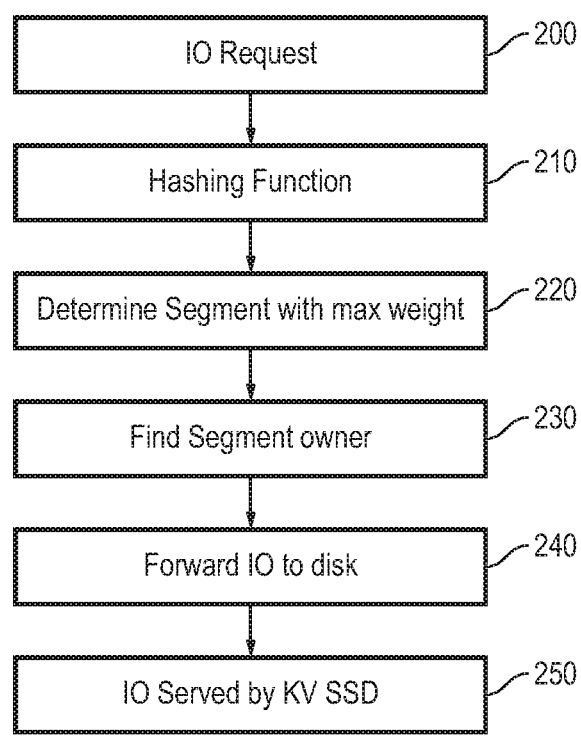
FIG. 5 illustrates an IO workflow method according to an embodiment of the present invention.

FIG. 5 illustrates an IO workflow method according to an embodiment of the present invention. FIG. 5 illustrates a workflow of the system when receiving an IO. According to the method of FIG. 5, IOs of reads/writes are received from a client (200) and are hashed and divided into segments (each with a weight) (210). The parameters namespace ID, LUN ID, and aligned offset may be used as input arguments to the hash.

The weights associated with each segment are compared to determine the segment(s) with the maximum (or highest) weight (220). The segment table is consulted to find the storage device associated with the segment(s) with the maximum weight (230). According to some embodiments, when only a single copy of the data is being stored, only the highest weighted segment is used, but when replica copies are being stored, a number of the highest weighted segments are used, the number being equal to the number of replica copies being stored. For example, when three replica copies of the data are being stored, the three highest weighted segments are used.

The IO is forwarded to the disk associated with the highest segment weight (240), which serves the IO (250). Note that multiple (N) copies of data may be saved in this manner by forwarding the IO to the N storage devices associated with the N highest weighted segments.

Embodiments of the present invention provide for data on a storage device to be maintained using either a key value (KV) store or a block store. When a KV store is used to store the data, the key may be generated from the IO request and the parameters namespace/lun ID, and offset into the lun. The namespace/lun ID form a unique pair in the pool and hence can be used as a key for the pool. The input block of data is the value associated with the key.

In addition to the key and the value associated with the key being passed to the KV SSD, an additional parameter "segment id" (or chuck ID) can also be passed to the drive as a hint. The KV SSD uses the hint to group keys together, e.g., in a same container. The grouping of keys may be used when load balancing data across drives is performed.

Further, a "segment id" parameter may be associated with each IO and used to group data and control data migration. In some KV SSD embodiments of the disclosure, data having the same segment ID are stored in a KV storage container. KV SSDs may house multiple such containers. Each container may also have an associated hop count value. The hop count value of each container represents the number of storage devices (or chunks) that must be added to the system before that container is migrated.

For example, a KV SSD 3 is added to the pool already containing KV SSDs 0, 1, and 2. When this occurs, KV SSDs 0, 1, and 2 are checked for containers associated with a hop value of one (indicating that when one disk is added, that data container is migrated). Containers having a hop value of one are thus migrated to the new KV SSD. All other containers on the old KV SSDs (0, 1, 2) are decremented by one value.

Figure 6:
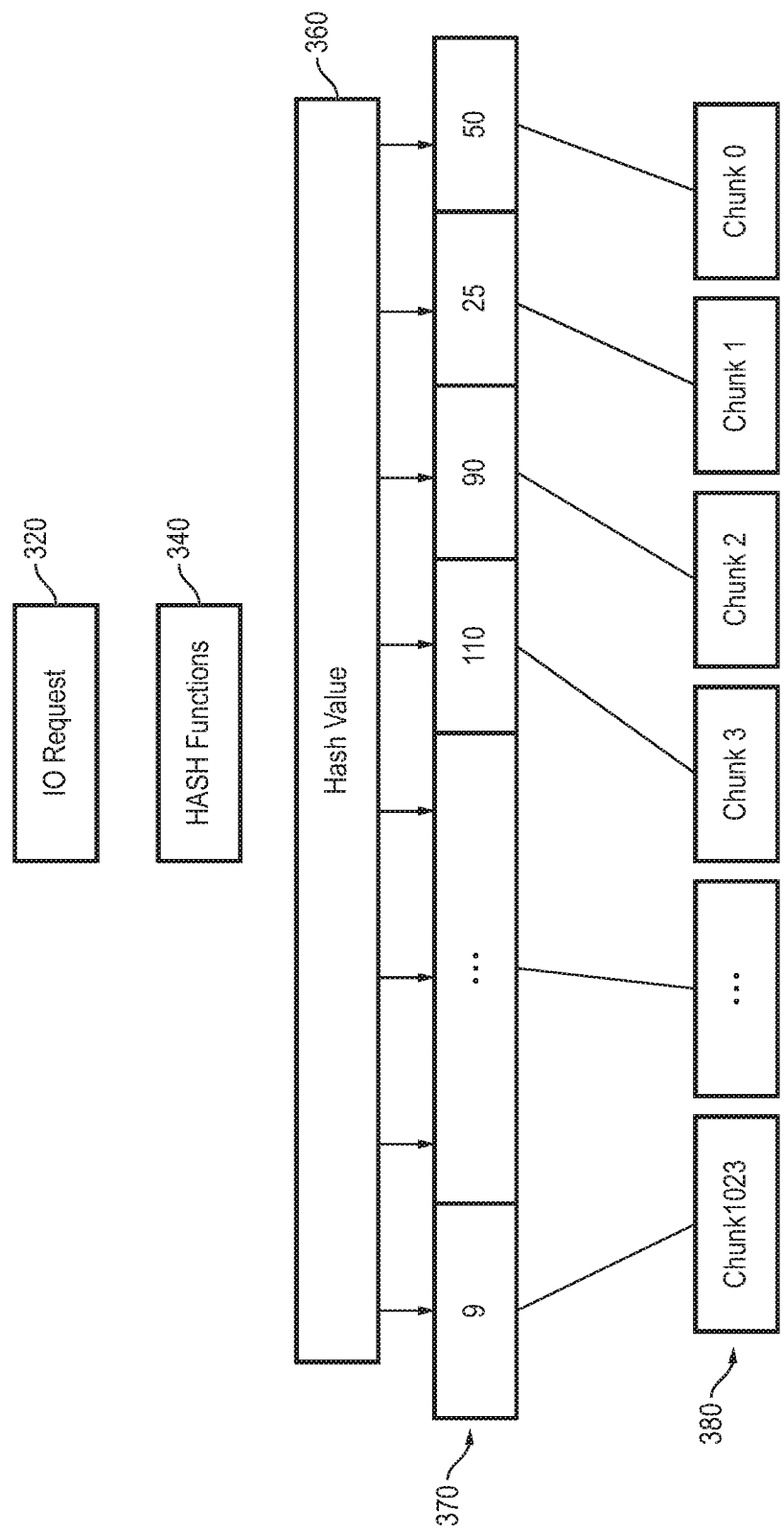
FIG. 6 is a block diagram of a logical view of a method according to another embodiment of the present invention.

FIG. 6 is a block diagram of a logical view of a method according to another embodiment of the present invention. FIG. 6 is similar to FIG. 2 except that example weights have been added. Descriptions of the same or similar features may be omitted.

Referring to FIG. 6, an IO request 320 is received by a distributed data storage system (or distributed environment). The distributed data storage system applies a hash function 340 (or a hashing function 340) or multiple has functions 340 (or multiple hashing functions 340) to a value associated with the data to calculate a hash value 360. The value associated with the data may be any of the following: a logical block address; a namespace/lun ID; a logical file offset in read/write requests; a combination thereof; and/or the like. The hash function 340 is used to uniformly distribute data. A crypto hash function can be used to distribute data randomly across all the drives.

The hash value 360 is broken up into X equal length values, called weights 370. Each weight 370 is Y bits long, where Y is an integer. Y is equal to the length of the hash value, in bits, divided by X.

Each of the weights 370 is associated with a chunk 380 (or a segment 380). Each chunk 380 corresponds to at least one of either the plurality of storage devices or the plurality of storage device openings. Each portion of the divided hash value 360 (i.e., each weight 370) has its own numerical value. Thus, each time data is hashed, each chunk gets a numerical value associated with it. This may be called the chunk's "weight" for that particular hash operation and IO. According to some embodiments of the present invention, there are the same number of weights 370 as there are chunks 380 (e.g., there may be 1,024 weights 370 when there are 1,024 chunks 380).

According to an embodiment of the present invention, in order to determine where data is stored (or where data should be stored), a highest weight chunk 380 of the plurality of chunks 380 is selected; for example, chunk 3 has a weight of 110. According to other embodiments, a lowest weight chunk may be selected or some other criteria may be used for selecting a chunk 380. The data is stored on the storage device corresponding to (or mapped to) the selected chunk 380.

According to an embodiment of the present invention, storing the data may include: determining a highest weight chunk of the plurality of chunks; determining whether the highest weight chunk corresponds to one of the storage devices or one of the storage device openings; when the highest weight chunk corresponds to one of the storage devices, storing the data in the storage device associated with the highest weight chunk; and when the highest weight chunk corresponds to one of the storage device openings: determining a chunk with a highest weight among the plurality of chunks that correspond to the storage devices; and storing the data in the storage device associated with the highest weight chunk among the plurality of chunks that correspond to the storage devices.

As an example, assume the distributed environment of FIG. 6 includes three storage devices. When the data is hashed, the weights are determined as shown in FIG. 6. The chunk with the highest weight is determined to be chunk 3 with a weight of 110.

Because there are only three storage devices, according to some embodiments, only the first three chunks (chuck 0 to chunk 2) will be associated with the storage devices and chunk 3 will be associated with a storage device opening. As such, it is determined that chunk 2 is the highest weight chunk that is associated with a storage device. Therefore, the data is stored in the storage device associated with chunk 2 since chunk 3 is not associated with a storage device. The data may be stored in a container with an associated hop count of 1, since storage device 3 will be the next storage device to be added.

According to an embodiment of the present invention, each of the storage devices and storage device openings is assigned a device ID that indicates an order in which the storage devices were added to the distributed environment or an order in which future storage devices will be added to (or will fill) the storage device openings in the distributed environment. Each of the chunks has a chunk ID equal to the device ID of the chunk's corresponding one of the plurality of storage devices or the chunk's corresponding one of the plurality of storage device openings. Each of the storage devices may include one or more hop containers, each with a hop count value that indicates if or when the data should be moved to another storage device.

When the highest weight chunk corresponds to one of the storage devices, the data is stored in a hop container, with a corresponding hop count value equal to zero, in the corresponding storage device. A hop count of zero indicates that the data does not need to be moved when more storage devices are added to the system.

When the highest weight chunk corresponds to one of the storage device openings, rather than to one of the storage devices, the data is stored in a hop container of one of the storage devices as described above. A corresponding hop count value of the hop container is equal to the chunk ID of the highest weighted chunk minus a highest device ID assigned to any of the storage devices. In this way, the hop count indicates the number of storage devices that are to be added to the system before the data moves.

For example, when a system includes 3 storage devices (0, 1, and 2) and two storage devices are added (3 and 4), the data within the hop container having an associated hop count of 1, from each of storage devices 0, 1, and 2 is moved to storage device 3 and the data within the hop container having an associated hop count of 2, from each of storage devices 0, 1, and 2 is moved to storage device 4.

The hop count value is a number indicating the number of storage devices that should be added to the system before the data moves to a new storage device. In other words, the hop count value can be determined by subtracting a device ID of the most recently added storage device (or the device ID of the storage device with the highest device ID) from the device ID of the storage device opening associated with the highest weighted chunk (i.e., the hop count=the device ID of the storage device opening associated with the highest weighted chunk–the device ID of the storage device with the highest device ID).

For example, when the distributed environment includes the three storage devices associated with chunk 0 to chunk 2, and the weights are as shown in FIG. 6, the data would be stored in chunk 3 (as chunk 3 has the highest weight for this data, i.e., 110) except that chunk 3 is not associated with a storage device. The chunks are assigned to storage devices in order and, as such, the next storage device that is added to the system will be associated with chunk 3. Because the next storage device to be added to the system will be associated with chunk 3 and chunk 3 is the highest weighted chunk, the data will be moved when 1 more storage device is added, and therefore the data is stored in a hop container having a hop count value of 1. In other words, the value of the hop count indicates how many more storage devices will be added to the system before the data is moved.

Further, embodiments of the present invention may provide for redundant back-up of data. When a replica copy of the data is to be stored in the distributed environment, a second highest weight chunk of the plurality of chunks that correspond to the storage devices is determined. The replica of the data is then stored in a second corresponding storage device, the second corresponding storage device corresponding to the second highest weight chunk.

When the second highest weighted chunk is associated with a storage device opening, the replica of the data may also be stored in a hop container within the second corresponding device. In this case, the hop count value will be equal to the device ID of the storage device opening associated with the second highest weighted chunk minus the device ID of the most recently added storage device (or the highest device ID of the storage devices).

Additional replicas may be stored in the same manner. For example, a second replica and a third replica may be stored in the third highest and fourth highest weighted storage devices, respectively, and they may be stored in appropriate hop containers.

Further, when a data read request is received, a portion of the data stored in the corresponding storage device and a different portion of the replica of the data stored in the second corresponding storage device may be read concurrently or simultaneously. In this way, read latency may be reduced.

Figure 7:
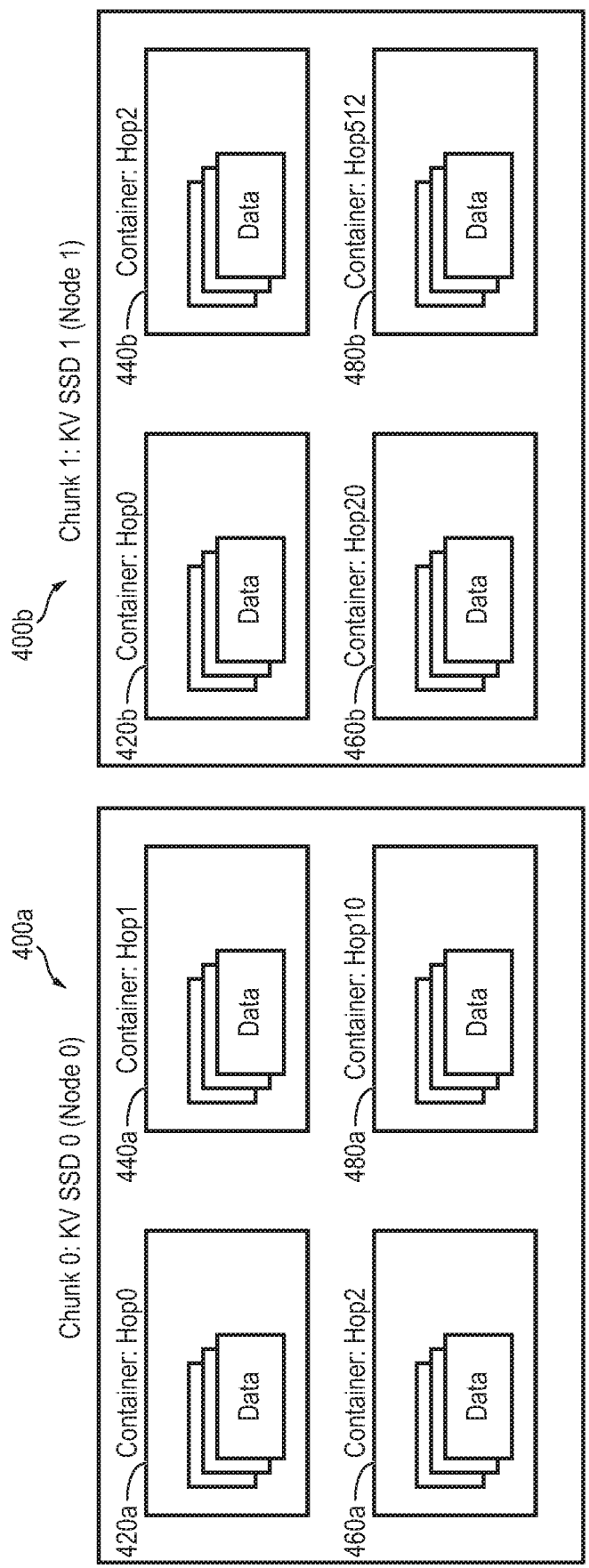
FIG. 7 illustrates a distributed environment having two storage devices each having a plurality of hop containers according to an embodiment of the present invention.

FIG. 7 illustrates a distributed environment having two storage devices each having a plurality of hop containers according to an embodiment of the present invention. Referring to FIG. 7, a first storage device 400a (or a first node (Node 0)) and a second storage device 400b (or a second node (Node 1)) each include a plurality of hop containers. The first storage device 400a may include four hop containers (420a, 440a, 460a, and 480a) and each hop container may have an associated hop count value (0, 1, 2, and 10, respectively). The second storage device 400b may include four hop containers (420b, 440b, 460b, and 480b) and each hop container may have an associated hop count value (0, 2, 20, and 512, respectively). Each hop count value may correspond to the number of storage devices that will be added to the distributed environment before the data in the associated hop container is moved. For example, the data in hop container 440a will be moved to the next storage device to be added to the distributed environment, and the data in hop container 480b will be added to the 512th storage device to be added to the distributed environment.

When a storage device is added to the distributed environment, all the data stored in a hop container with a hop count value of 1, within all of the storage devices, is moved to the new storage device and these hop containers are removed. All the hop count values (greater than 1) for each of the hop containers in all of the storage devices is reduced by one.

For example, when a new device is added to the distributed environment of FIG. 7, all the data in hop container 440a is moved to the new device, hop container 440a is removed, and the hop count values of hop containers 460a, 480a, 440b, 460b, and 480b are reduced by one. Because the data is stored in hop containers with a hop count value, all of the data does not need to be rehashed to determine which data belongs on the new storage device.

Figure 8:
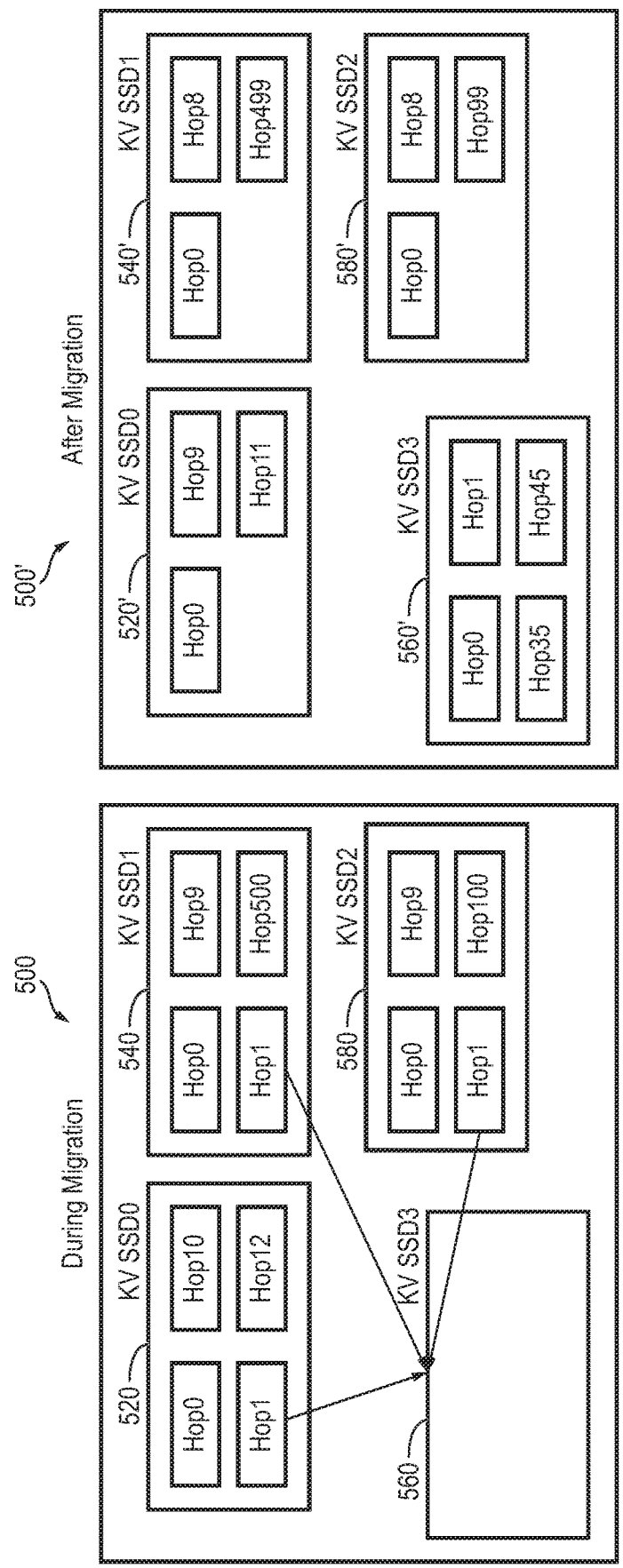
FIG. 8 illustrates a method of adding a storage device to a distributed environment according to an embodiment of the present invention.

FIG. 8 illustrates a method of adding a storage device to a distributed environment according to an embodiment of the present invention. Referring to FIG. 8, a distributed environment 500 may include three storage devices already in the distributed environment (e.g., KV SSD0 520, KV SSD1 540, and KV SSD2 580) and one new storage device being added to the distributed environment (KV SSD3 560).

Each of the three storage devices already in the distributed environment has hop containers with associated hop count values. When the new storage device KV SSD3 is added, all of the data in hop containers with a hop count value of 1 is moved to the new storage device KV SSD3. Further, when the data is moved, it is rehashed in order to determine which hop container in the new drive KV SSD3 to add the data to. Further, when the data has been relocated, the hop containers with a hop count value of 1 are removed from KV SSD0, KV SSD1, and KV SSD2, and the hop containers within KV SSD0, KV SSD1, and KV SSD2 with a hop count value greater than 1 are reduced by 1.

After migration of the data is complete, a distributed environment 500' may include four storage devices in the distributed environment (E.G., KV SSD0 520', KV SSD1 540', KV SSD 580'2, and KV SSD3 560'), each with data stored in hop containers.

After the new drive is added, the segment table may also be updated, as described above, to indicate which segments/chunks it has just taken responsibility for.

Embodiment of the present invention provide a method of adding a new storage device to a distributed environment including a plurality of storage devices, each of the storage devices including one or more hop containers, each hop container having a corresponding hop count value. The method includes transferring, to the new storage device, all data located in the hop containers, having a corresponding hop count value equal to one, of each of the plurality of storage devices. The method further includes removing the hop containers, having the corresponding hop count value equal to one, of each of the plurality of storage devices, and decreasing all of the corresponding hop count values, that are greater than zero, by one.

The method further includes hashing, using a hash function, all of the transferred data, and storing the transferred data in one or more hop containers of the new storage device based on the hashing.

Storing the transferred data may include: calculating a hash value by applying a hashing function to the data; splitting the hash value into a plurality of weights, each weight corresponding to one of a plurality of chunks, each chunk corresponding to either one of the plurality of storage devices or one of the plurality of storage device openings; determining a highest weight chunk; determining whether the highest weight chunk corresponds to the new storage device or to one of the storage device openings; when the highest weight chunk corresponds to the new storage device, storing the transferred data in a hop container, of the one or more hop containers, having a hop count value of zero; and when the highest weight chunk corresponds to one of the storage device openings, storing the data in a hop container, of the one or more hop containers, with a corresponding hop count value equal to a chunk ID of the highest weighted chunk minus a device ID of the new storage device.

A hop count value corresponding to a particular hop container may indicate how many more storage devices are to be added to the distributed environment before the data in the particular hop container is moved to a new storage device. Further, the new storage device may be capable of accepting read requests and write requests while the method is being performed.

Aspects of embodiments according to the present invention relate to a method of managing data in a distributed environment using a weight based approach.

It will be understood that, although the terms "first," "second," "third," etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the spirit and scope of the present invention.

A relevant device or component (or relevant devices or components) according to embodiments of the present invention described herein may be implemented utilizing any suitable hardware (e.g., an application-specific integrated circuit), firmware (e.g., a DSP or FPGA), software, or a suitable combination of software, firmware, and hardware. For example, the various components of the relevant device(s) may be formed on one integrated circuit (IC) chip or on separate IC chips. Further, the various components of the relevant device(s) may be implemented on a flexible printed circuit film, a tape carrier package (TCP), a printed circuit board (PCB), or formed on a same substrate as one or more circuits and/or other devices. Further, the various components of the relevant device(s) may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present invention.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention."

As used herein, "substantially," "about," and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

Features described in relation to one or more embodiments of the present invention are available for use in conjunction with features of other embodiments of the present invention. For example, features described in a first embodiment may be combined with features described in a second embodiment to form a third embodiment, even though the third embodiment may not be specifically described herein.

A person of skill in the art should also recognize that the process may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art. The altered sequence may include all of the steps or a portion of the steps.

Although this invention has been described with regard to certain specific embodiments, those skilled in the art will have no difficulty devising variations of the described embodiments, which in no way depart from the scope and spirit of the present invention. Furthermore, to those skilled in the various arts, the invention itself described herein will suggest solutions to other tasks and adaptations for other applications. It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents.

What is claimed is:

1. A method of storing data in a distributed environment comprising one or more storage devices, the method comprising:
receiving a request to store the data;
calculating a hash value by applying a hashing function to a value associated with the data;
generating one or more weights based on the hash value, a weight corresponding to one of one or more chunks;
selecting a chunk from among the one or more chunks having a higher weight than other ones of the chunks, wherein the selected chunk corresponds to a storage device of the one or more storage devices, the selected chunk comprising a chunk identity (ID) equal to a device ID of the storage device corresponding to the selected chunk, wherein the device ID comprises an indication of an order of addition of the storage devices to the distributed environment; and storing the data in the storage device corresponding to the selected chunk, wherein the data is stored in a hop container of the storage device with a corresponding hop count value, wherein the storage device comprises one or more hop containers and based on determining that an additional storage device is added to the one or more storage devices, the data located in the hop containers, having the corresponding hop count value equal to one, of the storage device is transferred to the additional storage device.

2. The method of claim 1, wherein generating one or more weights based on the hash value comprises:

splitting the hash value into X equal length values, a length value of the X equal length values is Y bits long, where X is equal to a total number of chunks, Y is equal to the length, in bits, of the hash value divided by X, and X and Y are integers, and wherein the total number of chunks is equal to a sum of a total number of the storage devices and a total number of storage device openings.

3. The method of claim 1, wherein the storage devices are key value solid state drives (KV SSDs).

4. The method of claim 1, wherein the value associated with the data is one of a logical block address (LBA) of the data and a logical unit number (LUN) of the data.

5. A method of storing data in a distributed environment comprising one or more storage devices, the method comprising:

receiving a request to store the data;

calculating a hash value by applying a hashing function to a value associated with the data;

generating one or more weights based on the hash value, a weight corresponding to one of one or more chunks;

selecting a chunk of the one or more chunks based on the weight; and storing the data in a corresponding storage device, the corresponding storage device corresponding to the selected chunk, wherein the distributed environment further comprises one or more storage device openings, a storage device opening indicating a reserved spot for adding an additional storage device, wherein the chunk of the one or more chunks corresponds to either one of the storage devices or one of the storage device openings, and wherein the selecting the chunk comprises:

determining a highest weight chunk of the one or more chunks;

determining whether the highest weight chunk corresponds to one of the storage devices or one of the storage device openings;

based on determining that the highest weight chunk corresponds to one of the storage devices, selecting the highest weight chunk; and based on determining that the highest weight chunk corresponds to one of the storage device openings:

determining the chunk with the highest weight among the one or more chunks corresponding to the storage devices; and selecting the chunk with the highest weight among the one or more chunks corresponding to the storage devices.

6. The method of claim 5,

Wherein a storage device of the storage devices and the storage device opening of the storage device openings are assigned a device identity (ID) that indicates an order in which the storage devices were added to the distributed environment or an order in which additional storage devices fill the storage device openings in the distributed environment, wherein the chunk comprises a chunk ID equal to the device ID of a corresponding one of the storage devices or a corresponding one of the storage device openings, wherein based on determining that the highest weight chunk corresponds to one of the storage devices, the data is stored in a hop container, with a corresponding hop count value equal to zero, in the corresponding storage device, and wherein based on determining that the highest weight chunk corresponds to one of the storage device openings, the data is stored in a hop container, the hop container having a corresponding hop count value equal to the chunk ID of the highest weighted chunk minus a highest device ID assigned to any of the storage devices, in the corresponding storage device.

7. The method of claim 6, wherein a hop count value corresponding to a particular hop container indicates how many more storage devices to add to the distributed environment.

8. The method of claim 6, further comprising:

determining a second highest weight chunk of the one or more chunks corresponding to the storage devices; and storing a replica of the data in a second corresponding storage device, the second corresponding storage device corresponding to the second highest weight chunk, wherein, in the distributed environment, based on determining that a data read request is received, a portion of the data stored in the corresponding storage device and a different portion of the replica of the data stored in the second corresponding storage device are read.

9. The method of claim 6, wherein the storage devices are key value solid state drives (KV SSDs), wherein the hop container is a KV SSD container, and wherein, within a KV SSD of the KV SSDs, data associated with a same chunk ID is stored in a same KV SSD container.

10. A distributed data storage system comprising:

one or more storage devices, wherein based on determining that data is to be stored to the distributed data storage system a hash value is calculated by applying a hashing function to a value associated with the data, one or more weights are generated based on the hash value, a weight corresponding to one of one or more chunks, a chunk from among the one or more chunks having a higher weight than other ones of the chunks is selected, the selected chunk comprising a chunk identity (ID) equal to a device ID of the storage device corresponding to the selected chunk, and the data is stored in a storage device of the one or more storage devices corresponding to the selected chunk having the higher weight than the other ones of the one or more chunks, wherein the device ID comprises an indication of an order of addition of the storage devices to the distributed data storage system, and wherein the data is stored in a hop container of the storage device with a corresponding hop count value, wherein the storage device comprises one or more hop containers and based on determining that an additional storage device is added to the one or more storage devices, the data located in the hop containers, having the corresponding hop count value equal to one, of the storage device is transferred to the additional storage device.

11. The distributed data storage system of claim 10, further comprising:
one or more storage device openings indicating reserved spots for adding additional storage devices,
wherein a storage device of the one or more storage devices comprises one or more hop containers and a hop container of the one or more hop containers has a corresponding hop count value indicating a number of the additional storage devices, and
wherein the chunk corresponds to either one of the storage devices or one of the storage device openings.

12. The distributed data storage system of claim 11,
wherein the storage devices are key value solid state drives (KV SSDs),
wherein the hop containers are KV SSD containers, and
wherein, within a KV SSD of the KV SSDs, data associated with a same chunk ID is stored in a same KV SSD container.

13. The distributed data storage system of claim 10, wherein the one or more storage devices comprise one or more key value solid state drives (KV SSDs).

14. A distributed data storage system comprising:
one or more storage devices,
wherein based on determining that data is to be stored to the distributed data storage system a hash value is calculated by applying a hashing function to a value associated with the data, one or more weights are generated based on the hash value, a weight corresponding to one of one or more chunks, a chunk of the one or more chunks is selected, and the data is stored in a corresponding storage device, the corresponding storage device corresponding to the selected chunk,
one or more storage device openings indicating reserved spots for adding additional storage devices,
wherein a storage device of the one or more storage devices comprises one or more hop containers and a hop container of the one or more hop containers has a corresponding hop count value indicating a number of the additional storage devices, and
wherein the chunk corresponds to either one of the storage devices or one of the storage device openings,
wherein selecting the chunk comprises determining a highest weight chunk of the one or more chunks and determining that the highest weight chunk corresponds to one of the storage devices or one of the storage device openings, wherein based on determining that the highest weight chunk corresponds to one of the storage devices, the highest weight chunk is selected as the selected chunk, and wherein based on determining that the highest weight chunk corresponds to one of the storage device openings a chunk with a highest weight among the one or more chunks corresponding to the storage devices is determined and the chunk with the highest weight among the one or more chunks corresponding to the storage devices is selected as the selected chunk, and
wherein based on determining that an additional storage device is added to the storage devices, the data located in the hop containers, having the corresponding hop count value equal to one, of the storage device of the one or more storage devices is transferred to the additional storage device.

* * * * *